A. G. McADIE.
ABSOLUTE HYGROGRAPH.
APPLICATION FILED APR. 11, 1918.
1,309,531.
Patented July 8, 1919.
2 SHEETS—SHEET 2.
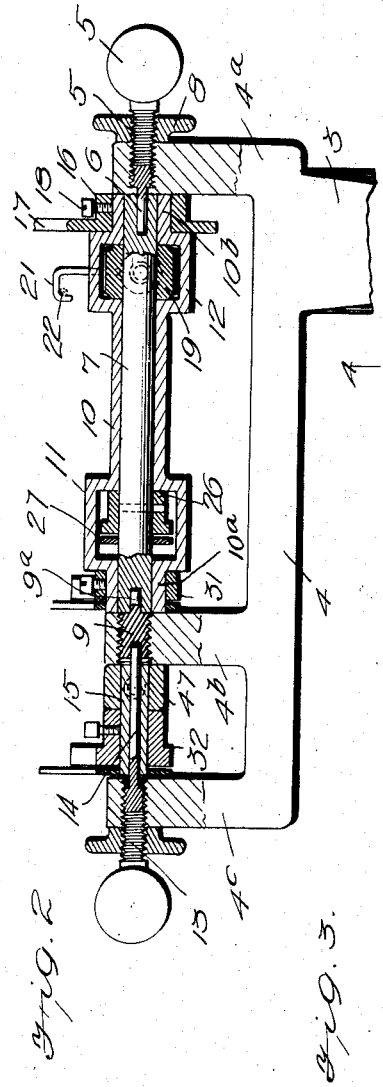
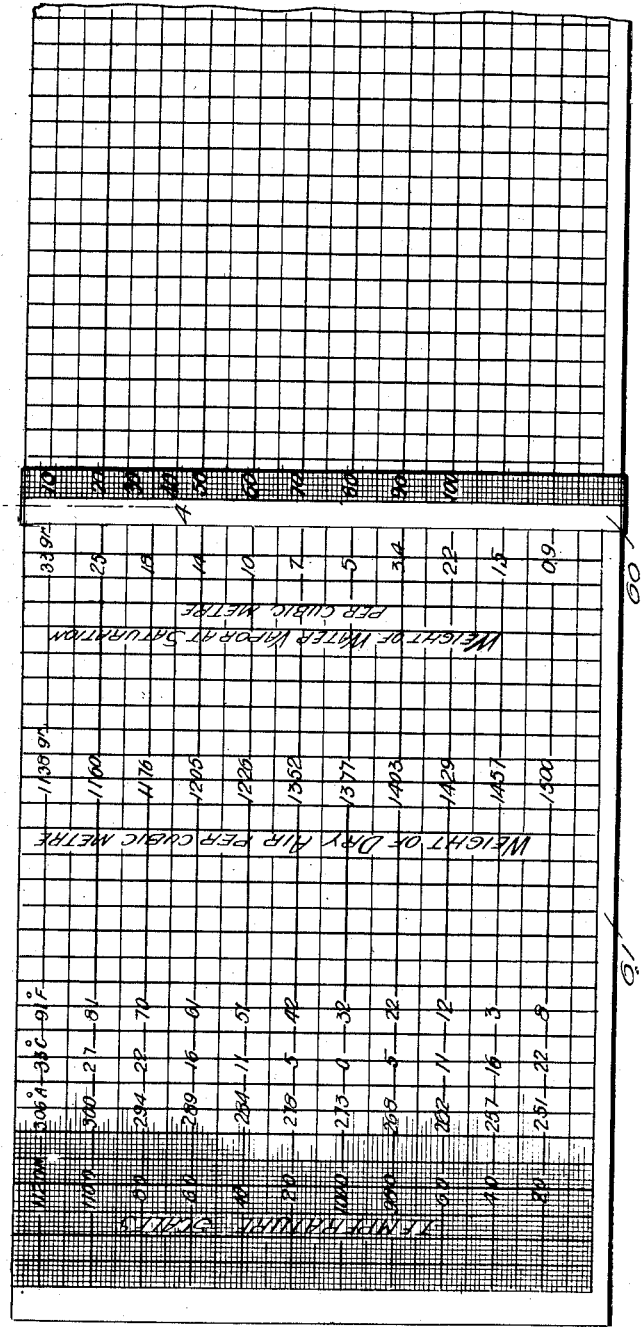
WITNESSES
F. C. Barry
INVENTOR
Alexander G. McAdie
BY
ATTORNEYS

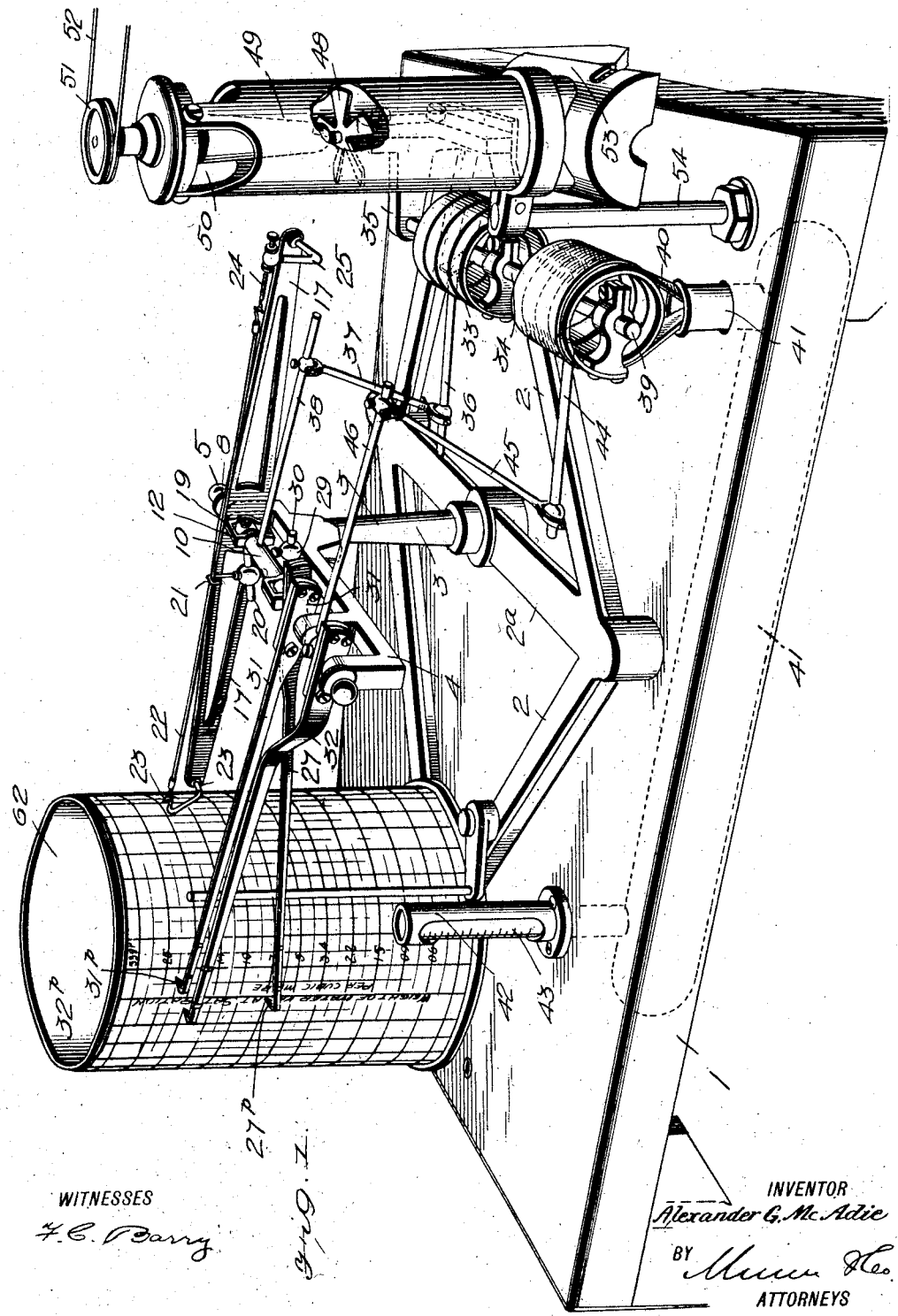

UNITED STATES PATENT OFFICE.

ALEXANDER G. McADIE, OF MILTON, MASSACHUSETTS.

ABSOLUTE HYGROGRAPH.

1,309,531.   Specification of Letters Patent.   Patented July 8, 1919.

Application filed April 11, 1918. Serial No. 227,859.

*To all whom it may concern:*

Be it known that I, ALEXANDER G. MC-ADIE, a citizen of the United States, and a resident of Milton, in the county of Norfolk and State of Massachusetts, have invented certain new and useful Improvements in Absolute Hygrographs, of which the following is a specification.

My invention relates to improvements in hygrographs, and it consists in the combinations, constructions, and arrangements herein described and claimed.

An object of my invention is to provide a device by means of which a continuous record of the weight of water vapor per unit of volume in atmospheric air may be made, that is to say, the weight in grams of the water vapor per cubic meter of mixed air and vapor at different percentages of saturation. A further object of my invention is to provide an instrument of relatively simple construction having means for indicating the actual temperature, the so called "sensible temperature" (wet bulb thermometer), and the percentage of saturation at any given temperature so that the calculation of the absolute weight of the water vapor may be readily determined.

A further object of my invention is to provide a novel recording sheet by means of which permanent records may be made, this sheet having fixed scales indicating temperatures in various systems as for instance, absolute, centigrade, and Fahrenheit, etc., weight of dry air per cubic meter, weight of water vapor at saturation per cubic meter, and percentage of saturation at any temperature. A further object of my invention is to provide a device having novel means for directing a current of air continuously on the "wet thermometer" thereby insuring rapid evaporation and hence a greater difference in temperature between the wet and dry thermometer readings, thus rendering the device more sensitive to small changes. Other objects will appear in the following specification and the novel features of the invention will be particularly pointed out in the appended claims.

My invention is illustrated in the accompanying drawings forming a part of this application, in which—

Figure 1 is a perspective view of the device, a portion thereof being shifted from normal position to show the two thermometers.

Fig. 2 is a section through the main bearings of the recording arms.

Fig. 3 is a face view of a portion of the recording sheet.

Fig. 4 is a section along the line 4—4 of Fig. 3.

In instruments which have been heretofore used for determining humidity, wet and dry thermometers have been used and from these calculations have been made of relative humidity. In many instances, however, it is desirable to know not only the relative humidity but also the actual weight of water vapor contained in a given volume of mixed air and water vapor. In cotton mills, flour mills, and manufacturing concerns generally wherever the dryness of the air affects the material it is especially desirable to know absolutely the amount of water vapor in order that the necessary means may be used to bring the atmosphere to the degree of humidity required for the best working conditions. The present invention is designed to provide a device for making a record by means of which the absolute weight of water vapor at any temperature may be readily ascertained.

In carrying out my invention, I provide a base 1 upon which is mounted a frame 2 of the shape shown in the drawings. This frame is of a diamond shape and is provided with a cross member 2ª upon which is mounted a standard 3 which bears a bracket 4. This bracket 4 forms a support for the recording arms. In Fig. 2, I have shown a detailed section through the preferred form, but it will be understood that this is by way of illustration only, and that any other suitable mounting might be used to give the various arms their relative movements as described hereinafter. In Fig. 2 it will be seen that one end 4ª of the bracket 4 is provided with a screw 5 having a reduced end 6 serving as a pivot member for a shaft 7. The screw 5 is held in position by means of a jam nut 8. The opposite end of the shaft 7 is held by means of a pin 9ª on the end of a screw 9 which is disposed in a bracket portion 4ᵇ. Rotatably mounted on the shaft 7 is a sleeve 10 having rectangular connecting portions 11 and 12 for the integral extensions 10ª and 10ᵇ, respectively.

At the opposite end of the bracket is a screw 13 having a reduced end portion in the form of a pin 14 which pases through a shaft 15, being loosely journaled in a bore in one end of the screw 9. Mounted on the end portion 10ᵇ of the sleeve 10 is a hub 16 which bears a beam 17. A set screw 18 secures the hub to the sleeve portion 10ᵇ so as to revolve with the latter on the shaft 7. A collar 19 is secured to the shaft 7 and is provided with a laterally extending arm 20 to which is secured an adjustable hook 21. The latter is arranged to engage a bundle of hairs 22, one end of the bundle being secured to a hook 23 carried by the beam 17 and the other end being secured to an adjusting screw 24 carried by a bracket 25 on the opposite end of the beam 17. It will be observed that the collar 19 which bears the arm 20 is disposed within the rectangular connecting portion 12 so as to give the collar free play with respect to the sleeve 10. Disposed within the rectangular extension 11 of the sleeve 10 is a collar 26 which is secured to the shaft 7 and revolves with it and which is provided with an arm 27 extending laterally therefrom, the end of the arm having an inked pen 27ᵖ to record the saturation weight of moisture. The arm 27 is counterbalanced by means of an adjustable weight 29 on an arm 30 secured to the collar 26. The sleeve 10 is moved by the dry thermometer and transmits its movement by means of the arm 17 to the marker 27ᵖ, but this movement is modified in transmission by the hook and hair connection, as explained later.

Secured to the portion 10ᵃ of the sleeve 10 is an arm 31 which is provided with an inked pen 31ᵖ to record the readings of the dry thermometer, the arm 31 being moved when the sleeve 10 is rotated. An arm 32 is secured to the shaft 15 and is provided with an inked pen 32ᵖ. The latter records the readings of the wet thermometer. From the description thus far given, it is apparent that when the shaft 7 is rotated the arm 27 will be moved, when the sleeve 10 is rotated the arm 31 will be moved, and when the shaft 15 is rotated, the arm 32 will be moved. The means for controlling the movements of the arm 31 consists of a so called "dry" thermometer. In the present instance, I have illustrated this dry thermometer as consisting of a helical spring 33 secured at one end to a support 34 mounted on a bracket 35, the opposite end being connected by means of an arm 36 to a link 37, the link in turn being connected to an arm 38 rigidly secured to the sleeve 10. Swivel joints are provided at the ends of the link 37. It will be apparent that as the temperature rises and falls, the expansion and contraction of the spring 33 will cause the movement of the sleeve 10 through the connecting members, hence the movement of the recording arm 31.

A wet thermometer 39 of somewhat similar construction controls the arm 32. The wet thermometer, however, has a strip of muslin 40 or other suitable evaporating material, the ends of which dip down into a well 41 which is kept supplied with water or other suitable liquid. The well 41 may be supplied through a filling pipe 42 which is provided with a gage 43. The wet thermometer is connected with the arm 32 by means of the arm 44, the link 45 and the arm 46 on the collar which is secured to the small shaft 15 as shown in Fig. 2.

In order to maintain a rapid evaporation of the liquid around the wet thermometer, I provide a fan 48 which is disposed in a tube 49 having openings 50 for the admission of air, said fan being operated by means of a pulley 51 driven by a belt 52 from any suitable source of motive power. The tube 49 terminates in an integral cover member 53 which is designed to fit over the wet thermometer. This cover member is adjustably mounted on an upright 54 so that it may be raised and turned to permit access to the wet thermometer as desired. In Fig. 1, the cover has been shown as turned aside, but it will be understood that the normal position of the cover is over the wet thermometer.

The recording sheet is shown in Fig. 3. A series of parallel lines indicate time. It is provided with a set of temperature scales, as for instance the Kelvin kilograde scale shown at N, the absolute shown at A, the centrigrade shown at C, and the Fahrenheit shown at F. The sheet is also provided with a scale giving the weight of a cubic meter of dry air at different temperatures, also the weight of a cubic meter of saturated vapor at different temperatures, while another scale gives the relative humidity percentage of saturation. This last scale is preferably, although not necessarily adjustable. To this end I prefer to print the scale on a band or loop 60 which is slidable on the main sheet 61 in the manner shown in Figs. 3 and 4.

The record cylinder 62 may be driven by any suitable clock work or motor mechanism, not shown. The record sheet may be applied to the cylinder and held thereon by any suitable means such as by rubber bands slipped over the upper and lower ends of the record sheet.

From the foregoing description of the various parts of the device, the operation thereof may be readily understood. It is well known that for every given temperature, there is for water vapor a definite saturation weight, $i.\ e.$, it is known experimentally that the weight of water vapor at a temperature of say 22° centigrade is 18 grams per cubic meter when saturated, or when having 100% relative humidity. The operation of the instrument is based upon this law. The dry thermometer records the actual temperature, the wet thermometer records the sensible temperature, and the saturated or dew point temperature is found on the record sheet by subtracting from the temperature indicated by the wet thermometer, as many degrees as the wet thermometer reading is below the dry thermometer reading. The temperature of saturation being known, one can read from the record sheet the saturation weight appropriate for this temperature. In order to permit this to be accomplished, I provide the arm 27 and the means for operating it already described. It will be apparent that when the air is dry, the hairs 22 will contract and hence will tend to exert an upward pressure on the hook 21 and this will raise the arm 27, thus indicating the smaller percentage on the scale 60. On the other hand, when there is considerable moisture in the air, the bundle of hairs 22 will tend to elongate thus permitting the arm 27 to lower. The device is calibrated to give correct percentage readings.

In ascertaining the actual weight of water vapor one should first read the dry thermometer, then the wet thermometer as stated above; the temperature of the dew point or saturation is approximately just as much below the wet temperature as this latter is lower than the dry.

As an example:—If the dry thermometer record is 1080 K. K., (70° F.) and the saturation is approximately 1040 K. K. (51° F.)

|       | 1080 K. K. | 294 A. | 21° C. | 70° F. |
|---|---|---|---|---|
| 35    | 1060 K. K. | 289 A. | 16° C. | 61° F. |
|       | 1040 K. K. | 284 A. | 11° C. | 51° F. |

Assured that the relatively humidity be 57%—obtained from tables or read off directly on the sheet by the pen 27 actuated by the handle of hairs. Now the saturation weight at 1040 K. K. (51° F.) as shown on the record is 10 grams per cubic meter, since the percentage of saturation is only 57, the weight of water vapor actually present is 5.7 grams i. e., 57% of 10.

It will be observed that not only does the record give the temperatures for any hour or minute of any day, but the percentage of humidity is also given so that on looking back over the record one may know of the actual weight of water vapor in the air at any time covered by the record.

I claim:—

1. In a recording hygrograph, a scale sheet, a plurality of pivoted arms mounted for movement on a common axis, each of said arms being provided with a marker arranged to engage the sheet, means for moving one of said arms for recording the actual temperature, means for moving another arm to record the sensible temperature, and means for moving a third arm for recording the percentage of saturation.

2. A recording hygrograph comprising a base, a standard carried by the base, a plurality of pivoted arms mounted in axial alinement on said standard, a dry thermometer for controlling the movement of one of said arms, a wet thermometer for controlling the movement of another of said arms, and a hygroscopic device acting conjointly with said dry thermometer for controlling the movement of the third arm.

3. A recording hygrograph comprising a base, a standard carried by the base, a plurality of pivoted arms mounted in axial alinement on said standard, a dry thermometer for controlling the movement of one of said arms, a wet thermometer for controlling the movement of another of said arms, a hygroscopic device acting conjointly with said dry thermometer for controlling the movement of the third arm, a movable scale sheet, and a marker carried by each of said arms and arranged to engage said scale sheet.

4. A recording hygrograph comprising a support, a shaft rotatably carried thereby, a sleeve mounted on said shaft for rotation with respect thereto, an arm carried by the sleeve, an arm carried by the shaft, a hygroscopic member mounted on said sleeve, a hook rigidly mounted on said shaft and arranged to engage said hygroscopic member, and a dry thermometer for operating said sleeve.

5. A recording hygrograph comprising a support, a shaft rotatably carried thereby, a sleeve mounted on said shaft for rotation with respect thereto, an arm carried by the sleeve, an arm carried by the shaft, a hygroscopic member mounted on said sleeve, a hook rigidly mounted on said shaft and arranged to engage said hygroscopic member, a dry thermometer for operating said sleeve, a second shaft in alinement with said first named shaft, an arm secured to said second named shaft, and a wet thermometer for operating said second named shaft.

6. An absolute hygrograph comprising a revolving scale sheet provided with a series of parallel lines indicating time, means for recording the actual temperature on said scale sheet at any given time, means for recording the sensible temperature on said scale sheet at the same time, means for recording the saturation weight at saturation temperature on the scale sheet at the same time, and an adjustable scale for indicating the relative humidity percentage of saturation.

ALEXANDER G. McADIE.